United States Patent
Pham et al.

(10) Patent No.: US 10,699,750 B1
(45) Date of Patent: Jun. 30, 2020

(54) TAGGING TRACKED OBJECTS IN A VIDEO WITH METADATA

(71) Applicant: Amazon Technologies, Inc., Seattle, WA (US)

(72) Inventors: Dominick Khanh Pham, Seattle, WA (US); Sven Daehne, Seattle, WA (US); Janet Galore, Seattle, WA (US); Damon Jon Ganem, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/427,161

(22) Filed: May 30, 2019

(51) Int. Cl.
*H04N 9/80* (2006.01)
*G11B 27/036* (2006.01)
*G06T 7/246* (2017.01)
*H04N 21/81* (2011.01)
*H04N 21/44* (2011.01)
*H04N 21/478* (2011.01)

(52) U.S. Cl.
CPC .......... *G11B 27/036* (2013.01); *G06T 7/248* (2017.01); *H04N 21/44008* (2013.01); *H04N 21/47815* (2013.01); *H04N 21/8146* (2013.01); *G06T 2207/10016* (2013.01)

(58) Field of Classification Search
CPC ... G06F 17/241; G06F 3/048; G06K 9/00671; H04N 21/4725; H04N 21/234318; H04N 21/47205; G06Q 30/0639; G06Q 30/0643; G06Q 10/10
USPC ....... 386/239, 241, 243, 248, 278, 282, 281, 386/290, 343, 353
See application file for complete search history.

(56) References Cited

U.S. PATENT DOCUMENTS

2009/0083815 A1 * 3/2009 McMaster .......... H04N 7/17318 725/110
2014/0100993 A1 * 4/2014 Farmer .............. G06Q 30/0251 705/27.1

OTHER PUBLICATIONS

U.S. Appl. No. 16/428,547, "Navigating and Interacting With Video Using Structured Video Content", filed May 31, 2019.
A. Lukezic et al., "Discriminative Correlation Filter With Channel and Spatial Reliability", IEEE Conference on Computer Vision and Pattern Recognition (CVPR), 2017, pp. 6309-6318 <http://openaccess.thecvf.com/content_cvpr_2017/html/Lukezic_Discriminative_Correlation_Filter_CVPR_2017_paper.html>.

* cited by examiner

*Primary Examiner* — Robert Chevalier
(74) *Attorney, Agent, or Firm* — Patterson + Sheridan, LLP (57) ABSTRACT

Embodiments herein describe a video editor that can identify and track objects (e.g., products) in a video. The video editor identifies a particular object in one frame of the video and tracks the location of the object in the video. The video editor can update a position of an indicator that tracks the location of the object in the video. In addition, the video editor can identify an identification (ID) of the object which the editor can use to suggest annotations that provide additional information about the object. Once modified, the video is displayed on a user device, and when the viewer sees an object she can is interested in, she can pause the video which causes the indicator to appear. The user can select the indicator which prompts the user device to display the annotations corresponding to the object.

20 Claims, 8 Drawing Sheets

TAGGING TRACKED OBJECTS IN A VIDEO WITH METADATA

BACKGROUND

The present invention relates to tagging an object in a video with metadata.

Currently, video consumption, navigation, and interaction are fairly limited. Users can watch a video with a different audio dubbing or subtitles, fast forward or rewind the video, or scrub the seeker to skip to different segments in the video. This limited interaction is due to the lack of contextual metadata available for the video. While subtitles and audio transcription data can provide some level of context about the video, many of the interesting aspects in a video are not spoken, such as visual objects within the moving frames. Identifying and tracking these objects is laborious and requires a frame-by-frame analysis.

DETAILED DESCRIPTION

Embodiments herein describe a video editor that can identify and track objects (e.g., products) in a video. For example, the video may be a promotional video advertising different items for decorating a house. The video editor can either automatically, or using a prompt from a user, identify a particular object in one frame of the video and then use an object tracking system to track the location of the object in other frames in the video. The video editor can update a position of an indicator (e.g., a marker) that tracks the location of the object as it moves in the video. In addition, the video editor can identify a product identification (ID) of the object e.g., a particular brand and model of a smartphone, a model number of a recliner, or a standard identification number). Using the product ID, the video editor can suggest metadata (e.g., annotations) that are associated with the product such a customer reviews, close-up pictures of the product, price, related videos, and the like.

Once modified, the video can be displayed on a user device (e.g., a television, tablet, or smartphone). When the user sees a product she can is interested in, she can pause the video which causes the indicator identifying a tracked product in the video to be displayed. The user can select the indicator (assuming the indicator corresponds to a product the user is interested in) which prompts the user device to display the metadata corresponding to the product (e.g., the annotations). The metadata helps the user make a more informed decision whether she would like to purchase the product.

Figure 1:
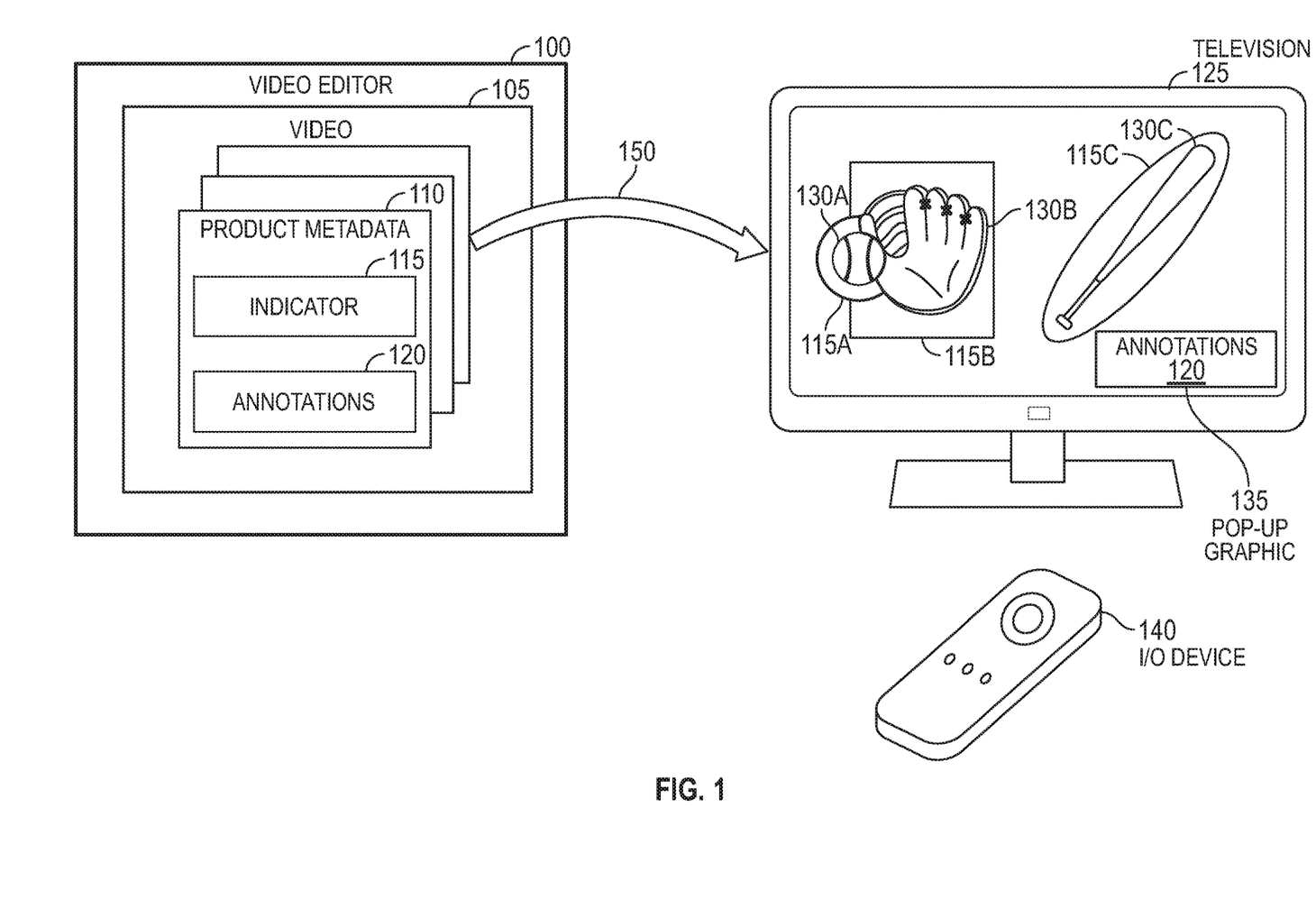
FIG. 1 illustrates presenting metadata corresponding to displayed objects in a video, according to various embodiments.

FIG. 1 illustrates presenting metadata corresponding to displayed objects in a video, according to various embodiments. FIG. 1 includes a video editor 100, a television 125, and an I/O device 140. In one embodiment, the video editor 100 adds product metadata 110 into a video 105. For example, an advertiser can use the video editor 100 to insert product metadata 110 for one or more products for sale displayed in the video 105 which may help a user viewing the video 105 to decide whether (or how) to purchase a product in the video 105. In this embodiment, the product metadata 110 includes an indicator 115 and annotations 120. The indicator 115 identifies a location of the product within the video 105. Often, the relative position of the product in the video moves as the camera angle changes or as the product itself moves. Thus, the video editor 100 can update the position of the indicator 115 in the various frames to identify the current location of the product.

The annotations 120 can include customer reviews, close-up pictures of the product, price of the product, related videos, other clips of the product in the same video, and the like. The annotations 120 can be any metadata about the product that may help the user to decide whether to purchase the product. As described below, the annotations 120 may be displayed in various formats when the user selects a product.

In one embodiment, the indicator 115 and the annotations 120 are stored in one or more files as metadata. In another embodiment, the indicator 115 may be transmitted as a package with the video 105 to the television 125, but not the annotations 120. For example, when the user selects the product, a user device retrieves the annotations 120 from a server (e.g., the cloud) so they can be displayed.

The arrow 150 illustrates transferring the video 105 to a television 125. For example, the television 125 may be internet-capable so it can download the video 105 from a video distribution system. A user (not shown) can use the I/O device 140 to play the video 105 on the television 125. For example, the I/O device 140 can include controls for navigating through a user interface (UI) which offers multiple videos, selecting a video, and playing the selected video. In this example, the I/O device 140 is a remote that includes interactive buttons and controls.

As the video 105 plays, the user may see a product she wishes to learn more about. In response, the user can pause the video 105 using the I/O device 140. In this example, the current frame of the video 105 being displayed on the television 125 includes three products 130—i.e., a baseball (product 130A), a baseball glove (product 130B), and a baseball bat (product 130C). Once paused, the television 125 displays respective indicators 115 around each of the products 130. That is, the indicator 115A surrounds the product 130A, the indicator 115B surrounds the product 130B, and the indicator 115C surrounds the product 130C. These indicators 115 can be bounding boxes formed from multiple curved and straight lines, ellipses, circles, and the like. As discussed below, the shape and type of the indicators 115 may depend on the shape of the corresponding product and whether that product overlaps with other products or objects (in the case of products 130A and 130B). In any case, the video editor 100 places the indicators 115 within the frame of the video 105 to identify a location of a particular product for the user. Moreover, although not shown, the frame of the video 105 may include other objects that are not selectable (i.e., the video 105 does not include product metadata 110 for those objects).

Using the I/O device 140, the user can select one of the three products she is interested in. For example, the I/O device 140 can include a scroll wheel or arrow keys to select one of the products. For example, using left and right arrow buttons, the user can select which of the indicators 115 is highlighted. When the indicator 115 corresponding to the desired product is highlighted, the user can use a different button to select the corresponding product. In another example, rather than using buttons, keys, or capacitive elements, the user could use voice commands such as ("select the baseball" or "select the middle product") to select one of the three products 130.

Depending on the user's selection, the television 125 displays the annotations 120 for that product in a pop-up graphic 135. That is, the graphic 135 may overlay whatever portion of the video 105 was previously being displayed in the location of the television 125 before the user made her selection. Moreover, the location of the pop-up graphic 135 (and the annotations 120) may vary depending on which product the user selected. The current location of the pop-up graphic 135 may be a result of the user selecting the product 130C. If the user had instead selected the product 130B, the pop-up graphic 135 may be disposed in the middle of the television 125. Moreover, the size of the pop-up graphic 135 may depend on the number of annotations 120. The graphic 135 could, for example, extend across the entire height or width of the television 125 and may cover up some or all of the products 130.

While the embodiments herein primarily discuss tracking products in a video 105 and associating annotations 120 with those products, this disclosure is not limited to products for sale and can be used for other applications. For example, children educational videos may have different objects in the video that a child can explore. In this example, the video 105 may display various rocks or gems. A child could pause the video and see the indicators 115 surrounding the different rocks or gems and can select a gem she is interested in. The annotations 120 can provide more information about the selected gem such as were it is found, how common it is, its density, and the like.

In another example, the embodiments herein can be used to enhance user experience when watching a television show or movie. Instead of associating the metadata 110 with products, the video editor 100 can generate metadata for actors in a scene. When paused, the indicators 115 can surround the various actors in the scene. The user can select one of the actors using the I/O device 140 which prompts the television 125 to display annotations 120 about that actor such as her filmography, education, current projects, other movies or shows she is in, birthplace, other scenes in the current show in which she appears, etc. In sum, using the techniques described herein, the video editor 100 can generate the metadata 110 for any displayed object in a video 105 which can include a product for sale, a person, object, geographical landmark, etc.

Figure 2:
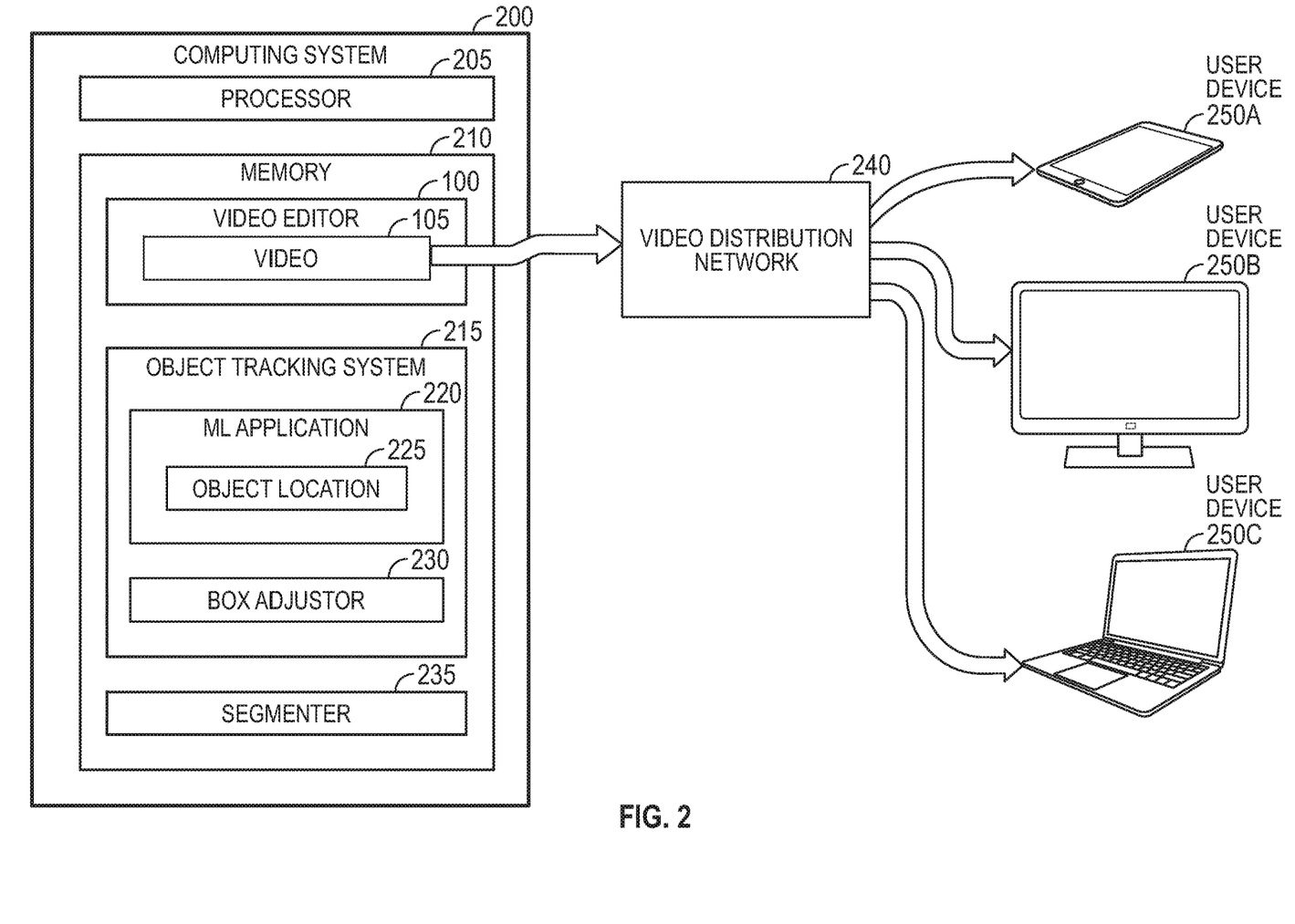
FIG. 2 is a block diagram for tracking objects and their corresponding metadata in a video, according to various embodiments.

FIG. 2 is a block diagram for tracking objects and their corresponding metadata in a video, according to various embodiments. FIG. 2 includes a computing system 200, a video distribution network 240, and user devices 250. The computing system 200 includes a processor 205 and memory 210. The processor 205 represents any number of processing elements which can include any number of processing cores. The memory 210 can include volatile memory, non-volatile memory, and combinations thereof.

The memory 210 stores the video editor 100, an object tracking system 215, and a segmenter 235. The video editor 100 may be a software application executing on the computing system 200. As discussed above, the video editor 100 permits a user to edit the video 105 to provide metadata for an object in the video 105. This process is described in more detail below.

The object tracking system 215 may be a software application executing on the computing system 200. The object tracking system 215 includes a machine learning (ML) application 220 and a box adjustor 230. The ML application 220 tracks the location of an identified object (e.g., a product) in the video 105 while the box adjustor 230 moves the location of an indicator corresponding to the object to reflect its new position in the video 105. For example, due to a change in camera angle or because the object is moving, the position of the object between multiple frames in the video 105 can vary. The ML application 220 can evaluate the frames to identify the location 225 of the object in each of the frames. Using this information, the box adjustor 230 can adjust the position of the indicator (e.g., a bounding box) as the location 225 of the object moves in the frames. In this manner, the indicator can accurately reflect the location of the object for multiple frames in which the object appears.

The segmenter 235 may be a software application that generates the indicator around the object. For non-overlapping objects, the segmenter 235 can use a standard shape for the indicator such as a rectangle or circle to mark the location 225 of the object in the frames of the video. However, if two objects overlap each other, the segmenter 235 may identify the boundary between the objects and use a non-standard shape such as a plurality of line segments (of varying lengths) to form the indicators so that a user can clearly distinguish between the two objects. For example, referring to FIG. 1, the baseball overlaps the baseball glove. As such, the corresponding indicator 115B has a non-standard shape that follows the outline of the baseball to make it clear the indicator 115B marks the location of the baseball glove (i.e., product 130B) rather than the baseball (i.e., product 130A).

The video distribution network 240 can be a wide area network (WAN) or a local access network (LAN) which distributes the video 105 to the user devices 250. The video distribution network 240 can be hosted in a cloud computing environment. In one embodiment, the video distribution network 240 is part of a subscription service or provided for free to users who sign up for an account. In any case, the video distribution network 240 can provide a repository of videos that can be provided to the user devices 250 on-demand or as part of advertisements.

The user devices 250 can be mobile phones, internet-capable televisions, laptops, tablets, streaming players (e.g., online media players), and the like. Using an I/O device (not shown, a user can pause the video 105 currently being played in order to learn more about a particular object in the video 105. The I/O device can be separate from the user device 250—e.g., a remote controller or mouse—or may be an integrated component in the user device 250—e.g., a touch screen or touch pad.

Figure 3:
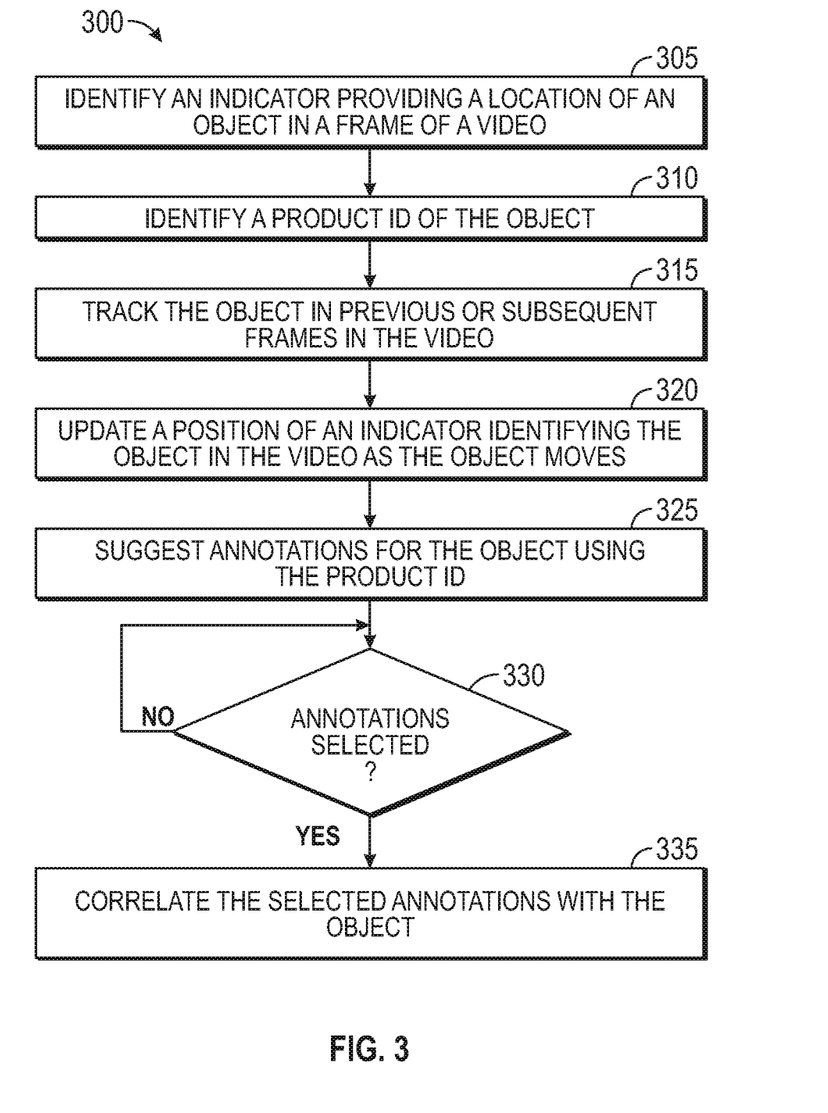
FIG. 3 is a flowchart for tracking objects and inserting annotations in a video, according to various embodiments.

FIG. 3 is a flowchart of a method 300 for tracking objects and inserting annotations in a video, according to various embodiments. At block 305, the video editor identifies an indicator providing a location of an object in a frame of a video. The indicator (e.g., a bounding box) may be set by a user or by an object detection algorithm. For example, an advertiser may identify different objects in a video which she wants to provide metadata. The advertiser may select the object by drawing an indicator (e.g., a bounding box) encapsulating the object (e.g., a product for sale).

Figure 4:
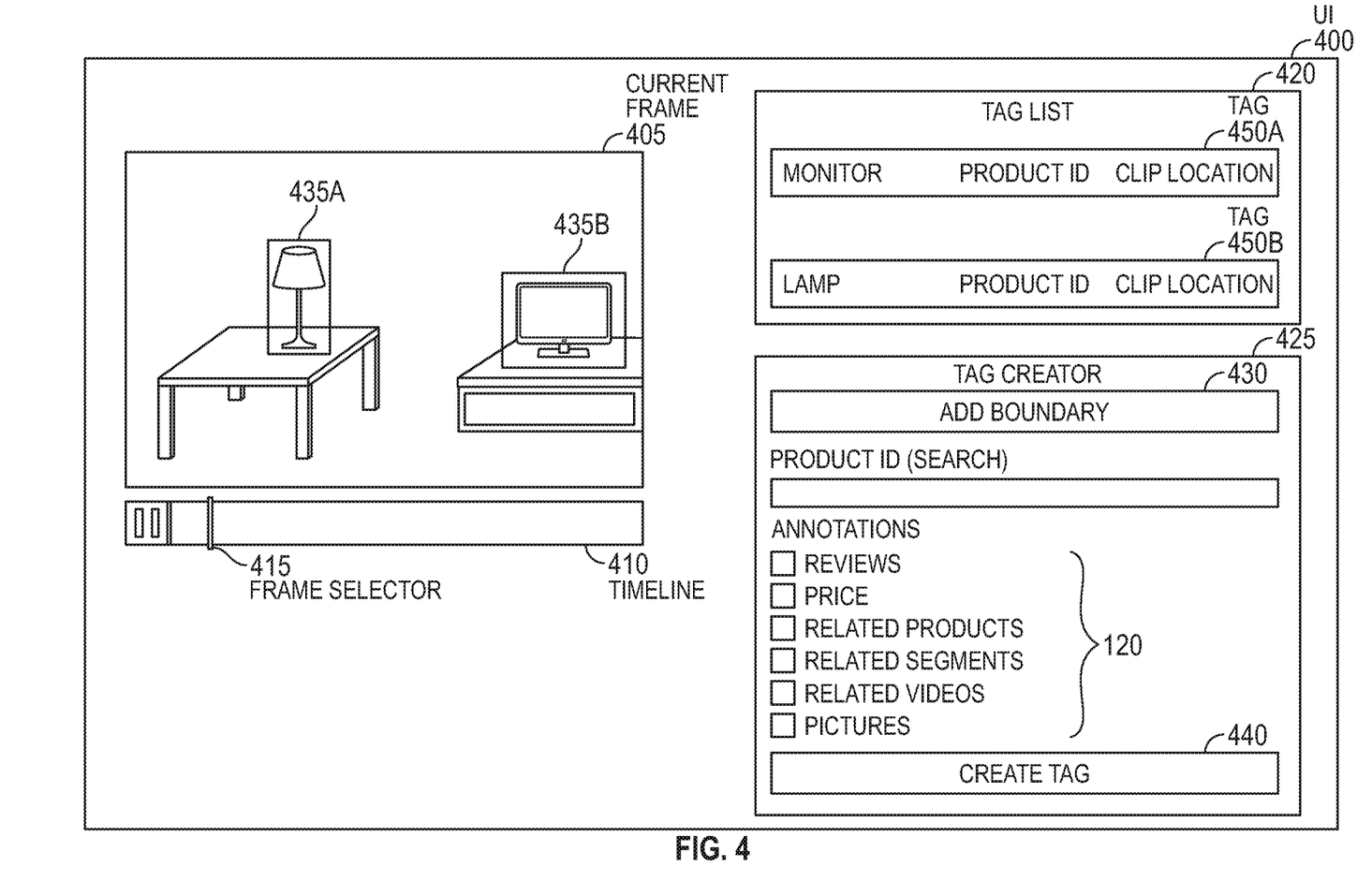
FIG. 4 illustrates a video editor for tagging objects in a video, according to various embodiments.

For ease of explanation, the blocks in the method 300 are discussed in parallel with FIG. 4 which illustrates a UI 400 of the video editor for tagging objects in a video, according to various embodiments. The UI 400 can be displayed on a computing system, and includes a current frame 405, a timeline 410, a frame selector 415, a tag list 420, and a tag creator 425. Using the frame selector 415, the user can move across the timeline 410 to select a particular frame in the video, which is displayed as the current frame 405. Put differently, the timeline 410 indicates the temporal location of each frame in the video. The frame selector 415 permits the user to select a particular one of the frames to be displayed as the current frame 405.

The tag creator 425 includes an ADD BOUNDARY button 430 that the user can select which permits the user to draw the indicators 435A and 435B around two objects in the current frame 405 (e.g., a lamp and monitor). That is, after pressing the button 430, the user can create the indicators 435 (e.g., bounding boxes) around objects in the current frame 405 of the video. The user can select only the objects she is interested in (e.g., objects her company sells) but not other objects in the frame 405, such as the desk and table.

While the user can create an indicator providing the location of the object of interest in the frame 405, in other embodiments, the indicator may be identified by an object detection algorithm. For example, the object detection algorithm may identify the objects in each frame and determine whether those objects match objects being sold by a particular distributor or manufacture. That is, the object detection algorithm may compare 3D models of the products (e.g., in a catalog or database) sold by the distributor to the shape of the objects in the frame 405 to determine whether there is a match. If there is a match, the object detection algorithm can generate the indicator which provides the location of that object in the video frame without user help.

Returning to the method 300, at block 310 the video editor identifies a product ID of the object. In FIG. 4, the tag creator 425 include a Product ID field which permits a user to type in product IDs for the objects identified by drawing the indicators 435A and 435B. For example, the user can provide a standard identification number or other unique product ID for the lamp and the monitor identified by the indicators 435A and 435B. In another example, the Product ID field may be a search field which permits the user to identify the standard identification number or unique ID by putting in general information such as the type of product, its manufacturer, color, partial product ID number, and the like. In that case, the UI 400 can provide a list of potential IDs that match the criteria provided by the user from which the user can select the correct ID.

In another embodiment, the object detection algorithm is able to identify the product ID of the object without user input. For example, the object may be a toy which is easy to uniquely identify from other toys using computer vision techniques. In that case, the video editor can identify the object by displaying the indicator 435 in the current frame 405, display the product ID, and ask the user to confirm this information. For example, the object detection algorithm can automatically detect multiple objects (and corresponding product IDs) in the video, but the user may want to only generate metadata for a portion of those objects. However, some objects may be difficult to detect such as different models of a mobile phone where the general aesthetics of the different models appear very similar. Thus, it may be too difficult for an object detection algorithm to distinguish between similar objects (e.g., different models or electronic devices or furniture made by the same or different manufactures). In that case, the object detection algorithm may display a list of product IDs and ask the user to verify, using the UI 400, which ID is the correct one for the objects identified in the current frame 405.

In one embodiment, the video editor can identify the product ID using information gathered when the video was first captured. For example, when capturing the video, identification information about the products or objects in the video may be stored within the video file or within a separate file. The identification information can include the product ID itself, or information for looking up the product ID such as a QR code or RFID tag ID for the product (which may have been identified when capturing the video). The video editor can then use this information to identify the product ID.

In one embodiment, the video editor may not identify the product ID for the objects identified in the current frame 405. For example, it may be sufficient to know the type of the object (e.g., a mobile phone made by Manufacturer A) rather than its particular model. Moreover, if the method 300 is performed to add metadata for an educational video or for an actor in a television show, instead of a product ID, the video editor may identify a type of the object (e.g., a particular type of rock or animal) or the name of the actor.

At block 315, the object tracking system tracks the object in previous or subsequent frames in the video. That is, the user can identify the object in the current frame (referred to as a key frame) using the indicator 435. Once identified, the object tracking system can identify that same object in previous and subsequent frames without user input. Thus, the user does not have to evaluate each frame and identify the location of the object, which can change throughout the frames. Instead, the object tracking system can use the ML application to identify the object in subsequent and previous frames automatically. The embodiments herein are not limited to any particular ML application, but can implement any ML application suitable for object detection and tracking in a video.

At block 320, the box adjustor updates a position of the indicator identifying the object in the video as the object moves. Put differently, in response to the object tracking system identifying a change of location of the object between frames, the box adjustor can update the position of the corresponding indicator for the new object in the frame.

In addition to adjusting the location of the indicator to reflect the new location of the object, the box adjustor may also change the shape of the indicator between frames. For example, the object may now overlap a different tracked object in the video (which has its own indicator), and in response, the box adjustor may adjust the boundaries of the indicator to better differentiate between the two objects. Conversely, if the object no longer overlaps another tracked object, the box adjustor may change the shape of the corresponding indicator to a standard shape (e.g., a rectangle or circle), such as the shape of the indicators 435A and 435B in FIG. 4.

Figure 5A:
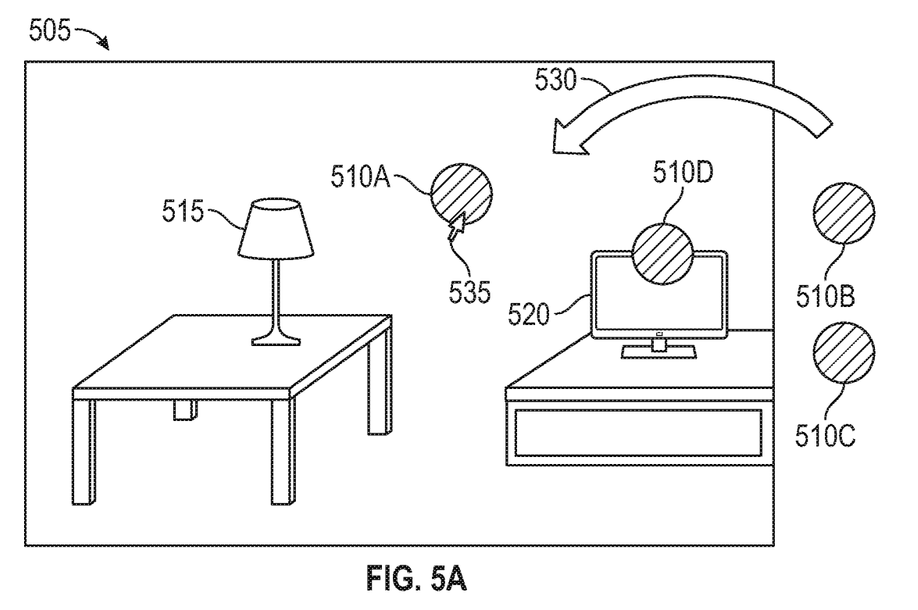
FIGS. 5A and 5B illustrate placing markers over objects in a video using a video editor, according to various embodiments.
Figure 5B:
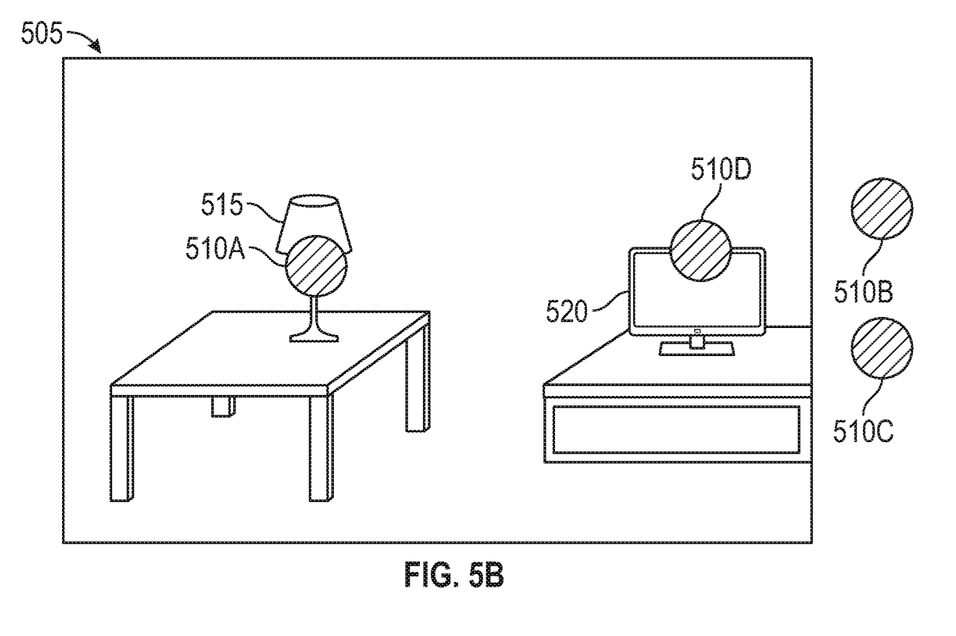

FIGS. 5A and 5B illustrate placing markers over objects in a video using a video editor, according to various embodiments. Specifically, FIG. 5A illustrate different types of indicators from the ones illustrated in FIG. 4. FIG. 5A illustrates a current frame 505 displayed in the UI of the video editor in FIG. 4 where the user is placing an indicator 510A over a corresponding object 515. The user's motion is indicated by the arrow 530 which shows the user has, using a cursor 535, drug the indicator 510A from the right side of the current frame 505 towards the object 515. Moreover, FIG. 5A illustrates that the user has already moved the indicator 510D to a location on the object 520. Thus, rather than using indicators with a boundary that encapsulate an object, FIG. 5A illustrates indicators 510 which can be disposed on a portion of the object. These indicators 510 can have a bright color or flash when displayed in the frame 505 to attract the viewer's attention.

FIG. 5B illustrates the frame 505 after the user has moved the indicator 510A over the object 515. For example, the user may perform FIGS. 5A and 5B as part of block 305 of the method 300 in order to correlate the indicators 510A and 510D to the objects 515 and 520, respectively. Once identified in the frame 505 (i.e., the key frame), the object tracking system can then update the location of the indicators 510A and 510D as the locations of the objects 515 and 520 change at blocks 315 and 320 of the method 300. Thus, the embodiments herein are not limited to any particular type of indicator and can include the bounding boxes in FIG. 4 as well as the markers illustrated in FIGS. 5A and 5B.

In one embodiment, the ML application used by the object tracking system may perform better when a bounding box is provided rather than the dot-type indicators illustrated in FIGS. 5A and 5B. In that case, the user (or an object detection algorithm) draws bounding boxes around the objects 515 and 520. The ML application can then track the objects 515 and 520 and update the position of the bounding boxes accordingly. The location of the bounding boxes can then be used to identify the location of the dot-type markers illustrated by the indicators 510. For example, the video editor (or the user device) can use an offset from a predefined point of the bounding box (e.g., its upper left corner) to determine the location of the indicator 510. Thus, the user device can display on the indicators 510 using a location of the bounding box while the bounding box itself is never displayed.

Returning to the method 300, at block 325 the video editor suggest annotations for the object using the product ID identified at block 310. In FIG. 4, the UI 400 displays a plurality of annotations 120 (e.g., reviews, price, related products, related segments, and related videos). The user can select which annotations 120 to include as metadata for the object and which to ignore. For example, when the product is selected, the user may want to display the customer reviews for the product, its price, and high-quality pictures. In that case, the user may select the first, second, and last check boxes to associates these annotations with the product. The remaining suggested annotations 120—i.e., related products, related segments, and related videos
   are ignored. In this manner, the user can control the type and quantity of metadata associated with each product or object.

In another embodiment, the user can provide her own annotations 120. The UI 400 can include a separate field where the user can attach pictures, links to other videos, text, or other metadata that can be displayed when the product is selected by the viewer.

At block 330, the video editor determines whether the user selected any annotations (e.g., whether the user checked any of the boxes illustrated in FIG. 4). If not, the video editor may continue to wait for the user. However, once the user makes her selections (or provides her own annotations), the method 300 proceeds to block 335 where the video editor correlates the selected annotations with the object. In one embodiment, the video editor packages the selected annotations with the video. The annotations (as well as the product ID and indicator) can be transmitted as a package (e.g., transmitted at the same time) with the audio and visual data of the video. However, in other embodiments, a link or pointer to the annotations may be provided with the video in order to correlate the selected annotations with the object. Once a viewer selects the object (or the indicator), the user device can use the link or pointer to retrieve the annotations for display.

In FIG. 4, the UI 400 includes a CREATE TAG button 440 which can indicate to the video editor that the user has finished creating a tag for an object in the current frame 405. In response, the create tag is added to the tag list 420. In this example, the tag list 420 includes tags 450A and 450B. The tags 450 list the type of the object (e.g., a monitor or lamp), the product ID, and a clip location. To generate the clip, the object tracking system may indicate to the video editor the various, sequential frames that include the object. Put differently, once the object is identified, the object tracking system can use the ML application to identify a plurality of sequential frames that include the object which can form a clip. For example, the clip may begin when the object is first identified (which can be in frames that are before the key frame) and ends when the object tracking system can no longer identify the object in a frame. The location of the clip in the video (e.g., the clip's start and stop frames or times) can be saved in the tags 450.

The user can then move to a different frame using the frame selector 415 and generate new tags for an object displayed in the new frame using the process described above. In this manner, the method 300 can be repeated as many times as desired by the user to identify objects, generate metadata corresponding to those objects (e.g., indicators 435 and annotations 120), identify a clip of the video containing the object, and generate the tags 450.

Figure 6:
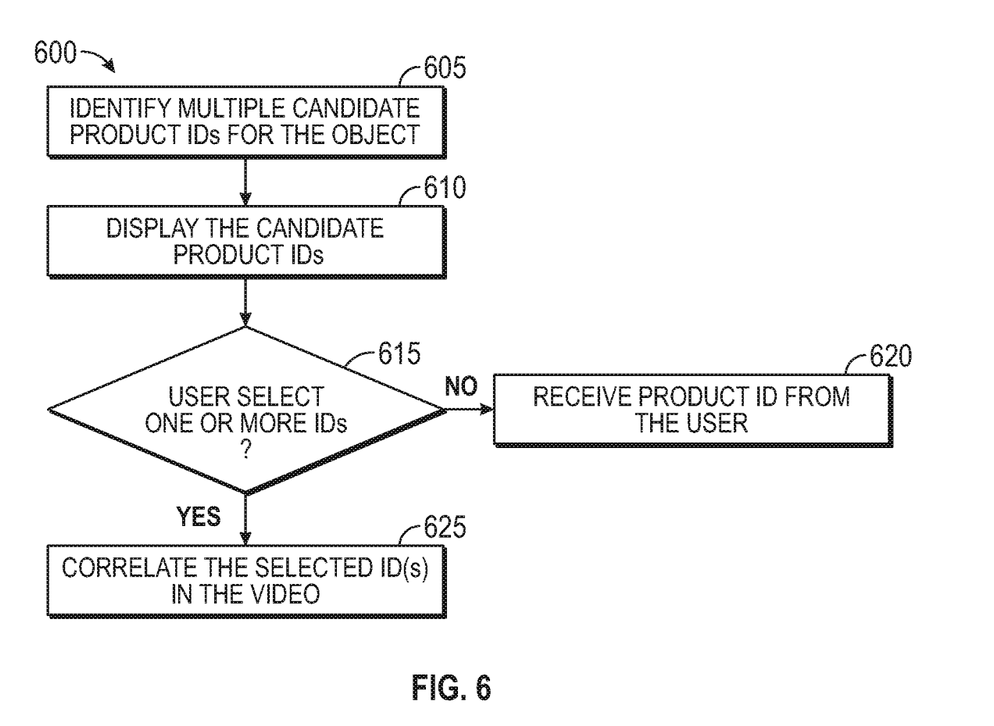
FIG. 6 is a flowchart for identifying product IDs for objects in a video, according to various embodiments.

FIG. 6 is a flowchart of a method 600 for identifying product IDs for objects in a video, according to various embodiments. The method 600 provides techniques for a video editor to provide multiple product IDs for a tracked object in a video. In one embodiment, the method 600 begins after a user or an object detection algorithm has identified an object in a video.

At block 605, the video editor identifies multiple candidate product IDs for the object. For example, the object tracking system may evaluate the object identified by the user and determine whether it can match the object to a known object. As mentioned above, due to similar appearances for different objects (e.g., different models of a mobile phone or tablet computer made by the same manufacture), the object tracking system may be unable to identify the exact model, and thus, the correct unique product ID for the object. At block 605, the object tracking system can provide a list of models or objects that it predicts the object could be.

At block 610, the video editor displays the candidate products IDs to the user, e.g., using the UI 400 illustrated in FIG. 4. At block 615, the user can select some or all of the candidate product IDs. If the user does not select any of the candidate IDs, the method 600 proceeds to block 620 where the video editor receives the product ID from the user. That is, since the correct product ID was not in the list displayed at block 610, the user can manually provide the correct ID using, e.g., the product ID field in the UI.

In one embodiment, the user selects only one of the candidate IDs. For example, if the video illustrates a doctor describing the usefulness of a particular medical device, it may be important to the doctor that the product ID corresponds to the exact model of the product being described. Despite having similar appearances, an earlier model of the medical device may not have the same features or reliability as the model being discussed in the video. Thus, it may be important to identify the correct product ID from the product ID of other models made by the same manufacture or other manufacturers that may have a similar appearance.

However, in another embodiment, the user may select multiple candidate IDs to include in the tag of the product. For example, the video may include a reviewer describing a particular piece of furniture, such as a table where different colors of the table have different product IDs. The reviewer may want to associate the various colors of the table to the same object since the only difference between the models is color. In that case, the list of candidate product IDs may include the IDs for the various colors in which the table is sold. The reviewer can select all of these product IDs to associate with the table. However, one of the candidate product IDs may be for a table sold by a competitor that has a similar look. The reviewer, however, may not want to include the competitor's table since he may not have reviewed it, or determined it has inferior quality. In that case, the user may not select that ID from the candidate product IDs. Alternatively, the reviewer may believe the competitor's table has similar features and decide to include its ID in the tag.

At block 625, the video editor correlates the selected ID(s) in the video. As discussed above, the tag for the object can include multiple product IDs or only one product ID. These IDs can then be used to retrieve suggested annotations for the product (e.g., block 325 of the method 300) when preparing metadata for the tracked object in the video.

Figure 7:
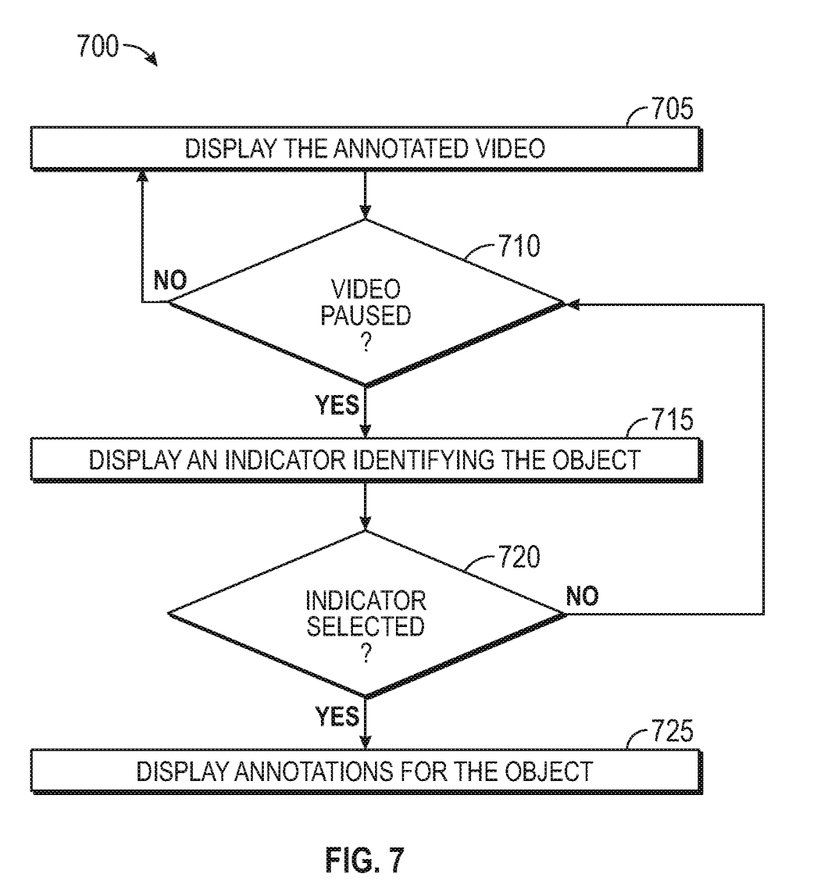
FIG. 7 is a flowchart for selecting objects and displaying corresponding annotations in a video, according to various embodiments.

FIG. 7 is a flowchart of a method 700 for selecting objects and displaying corresponding annotations in a video, according to various embodiments. In one embodiment, the method 700 is performed by a user device that has received a video that has been edited using the methods 300 and 600 described above. The method 700 may begin when a viewer instructs a user device to play an annotated video that includes tracked objects.

At block 705, the user device displays the annotated video. As mentioned above, the user can control when the user device plays the annotated video using a separate I/O device such as a remote, or an integrated I/O device such as a touchscreen or trackpad.

At block 710, the user device determines whether the user paused the video. If not, the method 700 returns to block 705 where the user device continues to play the video. However, once paused, the method 700 proceeds to block 715 where the user device displays an indicator identifying the object. That is, in this embodiment, the user device waits until the user pauses the annotated video before displaying the indicator. For example, once the user has paused the video, the user device may search the metadata corresponding to the video to determine whether the paused frame currently being displayed includes any tracked objects.

Figure 8:
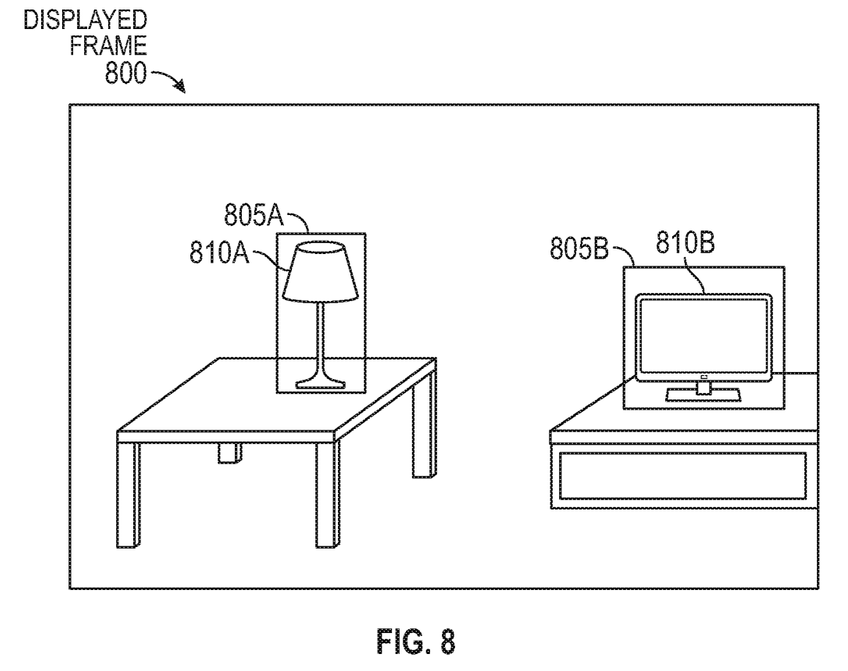
FIG. 8 illustrates displaying bounding boxes around objects in a video frame, according to various embodiments.

FIG. 8 illustrates displaying bounding boxes around objects in a displayed video frame 800, according to various embodiments. The video frame 800 may be the frame currently playing on the user device when the user pauses the video at block 710 of the method 700. In response, the user device displays the bounding boxes 805A and 805B (e.g., types of indicators). The bounding boxes 805A and 805B indicate that the objects 810A and 810B (i.e., the lamp and monitor) are tracked objects that have corresponding metadata. That is, the bounding boxes 805 indicate to the viewer that the user device can access additional metadata about the objects 810 encapsulated by the boxes 805, if desired.

While FIG. 8 illustrates bounding box 805, other types of indicators can be displayed when the user pauses the video. For example, the markers illustrated in FIGS. 5A and 5B could be used instead. In any case, these indicators may flash or have bright colors to make them readily apparent to the viewer so the user can easily identify the tracked objects. Further, the position of the markers may be based on a position of the bounding box without displaying the bounding box. That is, the user device can use the location of the bounding box to identify a location to display the dot-type markers shown in FIGS. 5A and 5B using a predefined offset.

In one embodiment, the user device changes the appearance of the indicator to be compatible with an accessibility option. For example, the viewer may be color blind, so the user device may change the color scheme of the indicator relative to whatever color was selected by the video editor.

Moreover, while waiting to pause the video before displaying the bounding boxes 805 may make the video less distracting to watch (if the viewer is not interested in the tracked objects), in another embodiment, the indicators may be displayed while the video is playing so the user knows when a particular segment has tracked objects. In another embodiment, the user device may display a less intrusive indicator when a particular segment has tracked objects. For example, the user device may display a red flag in the corner of the display whenever a particular clip being played includes one or more objects. If the viewer is interested in one of the objects in the video, the viewer can pause the video and the user device can display the indicators 805 as shown in FIG. 8 so the viewer can determine whether the object she is interested in is one of the tracked objects 810.

Returning to the method 700, at block 720, the user device determines whether the user selected an indicator for one of the tracked objects. That is, the viewer can use the I/O device to select one of the bounding boxes or the corresponding tracked object by, for example, touching the box in a touch-sensitive screen, using arrows in a remote, using a cursor, and the like. If the viewer is not interested in learning more about the tracked object, the method 700 returns to block 710 to determine whether the video is still paused. Although the video may display a dot-type marker and not the bounding box, the user device can still use a location of a bounding box (if this information was provided to the user device) to determine whether the corresponding object was selecting—e.g., if the user touched or clicked in the area contained within the bounding box.

In another embodiment, the location of the marker relative to the object may change based on user interaction. For example, if the marker is first displayed over the object as shown by the indicators 510A and 510D in FIG. 5D, but the user touches a portion to the left of the object 515 to select the object 515, the user device may change the offset so that the marker is displayed to the left of the object 515 the next time the viewer pauses the video at a frame that includes the object 515.

Assuming the viewer selected one of the indicators, the method 700 proceeds to block 725 where the user device displays annotations for the object corresponding to the box selected at block 720. The annotations can be transmitted at the same time as the video to the user device, or the user device can retrieve this information over a network—e.g., from the video distribution network.

Figure 9:
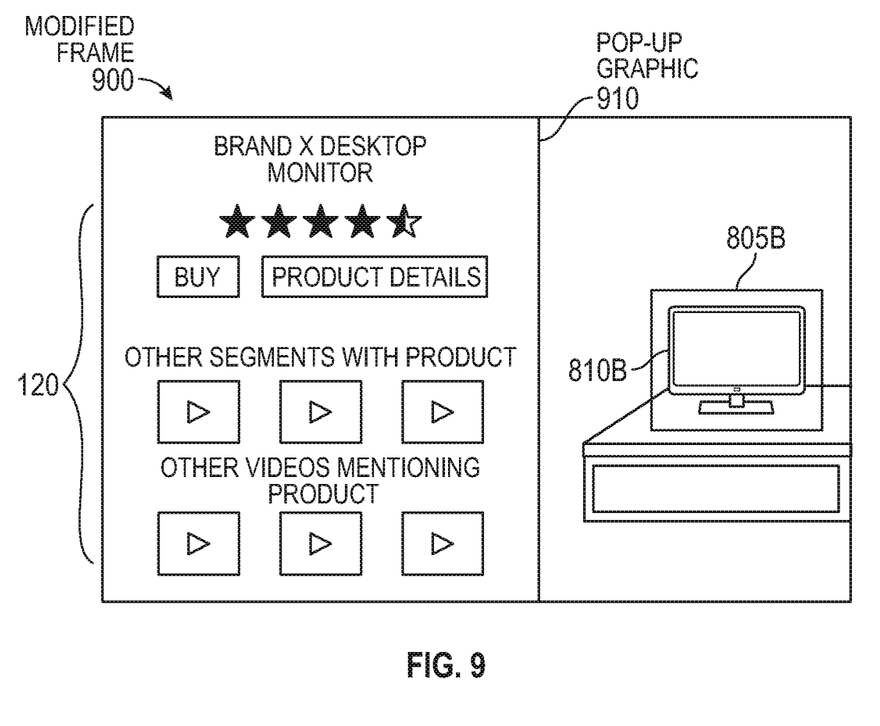
FIG. 9 illustrates displaying annotations for a selected object in a video frame, according to various embodiments.

FIG. 9 illustrates displaying annotations for a selected object in a modified video frame 900, according to various embodiments. In FIG. 9, it is assumed that the viewer has selected the box 805B which corresponds to the object 810B. In response, the user device displays a pop-up graphic 910 in the modified video frame 900 that includes the annotations 120 corresponding to the object 810B. By comparing the frame 900 to the frame 800 in FIG. 8, it can be seen that the pop-up graphic 910 covers the left portion of the frame 800 (which previously displayed the bounding box 805A and the object 810A). Of course, if the video does not take up the entire display of the user device, it may be possible to display the pop-up graphic 910 without it occluding the current frame being displayed.

In this example, the pop-up graphic 910 lists the product name—i.e., Brand X Desktop Monitor—and the annotations 120. These annotations 120 may be selected previously using the video editor using the method 300 in FIG. 3. The annotations 120 include customer reviews (4.5 stars out of 5), a button or link to buy the object 810B, a button or link to the product details for the object 810B, links to other segments (e.g., clips) in the same video that have the object 810B, and links to other videos (different from the current video) that have the object 810B.

The viewer can use the I/O device to interact with the annotations 120. For example, the viewer can use the I/O device to select the BUY button which displays a UI for purchasing the product or the PRODUCT DETAILS button that can alter the pop-up graphic 910 to display additional information about the object 810B. The viewer could also select one of the other segments in the video that show the object 810B. In response, the user device may remove the pop-up graphic 910 and move the video to the beginning of the corresponding segment. If the viewer selects a different video, the user device may retrieve and play the other video at a location that displays (or discusses) the object 810B. Of course, these are just a few of the different annotations 120 that can be displayed in the pop-up graphic 910 as well as different techniques for the viewer to interact with the annotations 120.

Using the embodiments described above, a video editor can identify objects in a video and track those objects as they move in subsequent frames by updating a location of an indicator. The video edit can also correlate annotations with those objects using, e.g., a product ID for the object. When the video is played on a user device, the viewer can pause the video and use the indicators to identify tracked objects in the video. The user can then select one of the objects which instructs the user device to display the annotations in, for example, a pop-up graphic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., computer readable program code) described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., video distribution network) or related data available in the cloud. For example, the video distribution network could execute on a computing system in the cloud and distribute the edited videos that include tracked objects and the corresponding annotations to the user devices. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
identifying a product for sale in a frame of a video;
tracking a changing location of the product in a plurality of frames in the video;
adding a bounding box to the video that identifies a location of the product in the video;
updating a position of the bounding box in the plurality of frames to track the changing location of the product;
identifying a product identification (ID) of the product, wherein the product ID uniquely identifies the product;
identifying at least one annotation for the product based on the product ID, wherein the at least one annotation comprises a link for purchasing the product;
playing the video on a user device;
upon determining a user has paused the video at one of the plurality of frames that includes the product, displaying the bounding box; and upon determining the user has selected at least one of the bounding box and the product using an input/output (I/O) device, displaying the at least one annotation in a graphical pop-up.

2. The method of claim 1, wherein tracking the changing location of the product in the plurality of frames in the video comprises:
performing a machine learning application to automatically identify the product in the plurality of frames.

3. The method of claim 1, wherein identifying the at least one annotation for the product based on the product ID comprises:
suggesting a plurality of annotations for the product based on the product ID; and
receiving a selection of a subset of the plurality of annotations, wherein the at least one annotation is one of the subset.

4. The method of claim 3, wherein the subset comprises customer reviews of the product and an identification of multiple other segments in the video that contain the product.

5. The method of claim 1, further comprising:
generating a tag corresponding to the product, wherein the tag comprises the product ID and a clip location indicating a start frame and an end frame where the product is displayed in the video.

6. A method comprising:
identifying an object in a frame of a video;
tracking a changing location of the object in a plurality of frames in the video;
updating a position of an indicator in the plurality of frames to track the changing location of the object;
identifying an ID of the object;
identifying an annotation for the object based on the ID, wherein the annotation provides additional information about the object; and
correlating the annotation with the object such that when a viewer of the video selects at least one of the indicator or the object, the annotation is displayed.

7. The method of claim 6, wherein identifying the object in the frame of the video comprises:
displaying a user interface (UI) that displays the frame and a frame selector for selecting different frames of the video along a timeline; and
identifying the object based on a user moving the indicator to a location proximate to the object in the frame.

8. The method of claim 7, wherein the indicator is a bounding box drawn around the object.

9. The method of claim 7, further comprising:
suggesting, in the UI, a plurality of annotations for the object based on the ID; and
receiving a selection of the user for a subset of the plurality of annotations, wherein the subset comprises the annotation.

10. The method of claim 6, wherein the object is a product for sale, the method further comprising:
identifying multiple candidate IDs for the object, wherein the multiple candidate IDs correspond to multiple different products with similar appearances as the object;
displaying the candidate IDs; and
receiving a selection of at least one candidate ID, wherein the at least one candidate ID comprises the ID.

11. The method of claim 10, wherein the at least one candidate ID comprises a plurality of selected candidate IDs, the method further comprising:
suggesting a plurality of annotations for the object based on the plurality of selected candidate IDs.

12. The method of claim 6, further comprising:
identifying a second object in the frame of the video;
updating a position of a second indicator to track a changing location of the second object;
determining that the second object overlaps the object in the frame; and
segmenting the indicator for the object and the second indicator for the second object to identify a boundary between the object and the second object.

13. The method of claim 6, wherein, when the video is played on a user device, the indicator is displayed only after the video is paused at a time where the object is displayed, and wherein the annotation is displayed on the user device only after the indicator is selected.

14. A non-transitory computer readable storage medium having computer readable program code embodied therewith, the computer readable program code executable by one or more computer processors to perform an operation, the operation comprising:
identifying an object in a frame of a video;
tracking a changing location of the object in a plurality of frames in the video;
updating a position of an indicator in the plurality of frames to track the changing location of the object;
identifying an ID of the object;
identifying an annotation for the object based on the ID, wherein the annotation provides additional information about the object; and
correlating the annotation with the object such that when a viewer of the video selects at least one of the indicator or the object, the annotation is displayed.

15. The non-transitory computer readable storage medium of claim 14, wherein identifying the object in the frame of the video comprises:
displaying a user interface (UI) that displays the frame and a frame selector for selecting different frames of the video along a timeline; and
identifying the object based on a user moving the indicator to a location proximate to the object in the frame.

16. The non-transitory computer readable storage medium of claim 15, wherein the operation further comprises:
suggesting, in the UI, a plurality of annotations for the object based on the ID; and
receiving a selection of the user for a subset of the plurality of annotations, wherein the subset comprises the annotation.

17. The non-transitory computer readable storage medium of claim 14, wherein the object is a product for sale, the operation further comprising:
identifying multiple candidate IDs for the object, wherein the multiple candidate IDs correspond to multiple different products with similar appearances as the object;
displaying the candidate IDs; and
receiving a selection of at least one candidate ID, wherein the at least one candidate ID comprises the ID.

18. The non-transitory computer readable storage medium of claim 17, wherein the at least one candidate ID comprises a plurality of selected candidate IDs, the operation further comprising:
suggesting a plurality of annotations for the object based on the plurality of selected candidate IDs.

19. The non-transitory computer readable storage medium of claim 14, the operation further comprising:
identifying a second object in the frame of the video;
updating a position of a second indicator to track a changing location of the second object;

determining that the second object overlaps the object in the frame; and segmenting the indicator for the object and the second indicator for the second object to identify a boundary between the object and the second object.

20. The non-transitory computer readable storage medium of claim 16, wherein, when the video is played on a user device, the indicator is displayed only after the video is paused at a time where the object is displayed, and wherein the annotation is displayed on the user device only after the indicator is selected.

* * * * *

UNITED STATES PATENT AND TRADEMARK OFFICE
CERTIFICATE OF CORRECTION

PATENT NO. : 10,699,750 B1
APPLICATION NO. : 16/427161
DATED : June 30, 2020
INVENTOR(S) : Dominick Khanh Pham et al.

Page 1 of 1

It is certified that error appears in the above-identified patent and that said Letters Patent is hereby corrected as shown below:

On the Title Page

Item (57), in Column 2, in "Abstract", Line 11, delete "she can is" and insert -- she is --, therefor.

Signed and Sealed this
Eighteenth Day of August, 2020

Andrei Iancu
*Director of the United States Patent and Trademark Office*